(12) United States Patent
Takagi et al.

(10) Patent No.: US 7,690,016 B2
(45) Date of Patent: Mar. 30, 2010

(54) TELEVISION BROADCAST RECEIVER

(75) Inventors: Toshihiro Takagi, Daito (JP); Tatsuo Miyagawa, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1293 days.

(21) Appl. No.: 11/167,269

(22) Filed: Jun. 28, 2005

(65) Prior Publication Data
US 2005/0289625 A1 Dec. 29, 2005

(30) Foreign Application Priority Data
Jun. 28, 2004 (JP) ............................ 2004-189975

(51) Int. Cl.
H04N 7/20 (2006.01)
H04N 7/16 (2006.01)
H04M 1/00 (2006.01)
H04B 1/00 (2006.01)

(52) U.S. Cl. ............................ 725/72; 725/29; 725/68; 342/359; 455/562.1; 455/25; 455/63.4

(58) Field of Classification Search .................... 725/72
See application file for complete search history.

(56) References Cited

U.S. PATENT DOCUMENTS

| 5,797,083 | A * | 8/1998 | Anderson ..................... 455/25 |
| 6,580,452 | B1 * | 6/2003 | Gangitano ................... 348/180 |
| 6,639,555 | B1 * | 10/2003 | Kane et al. ............ 343/700 MS |
| 6,982,745 | B2 * | 1/2006 | Miyabayashi ................ 348/193 |
| 2002/0051085 | A1 * | 5/2002 | Lee ............................ 348/570 |
| 2002/0083458 | A1 * | 6/2002 | Henderson et al. ............. 725/72 |
| 2003/0101453 | A1 * | 5/2003 | Matsuyama et al. ............ 725/40 |
| 2003/0228857 | A1 * | 12/2003 | Maeki ...................... 455/278.1 |
| 2004/0128689 | A1 * | 7/2004 | Pugel et al. .................... 725/72 |
| 2005/0245224 | A1 * | 11/2005 | Kurioka ....................... 455/272 |
| 2005/0285784 | A1 * | 12/2005 | Chiang et al. ................ 342/359 |

FOREIGN PATENT DOCUMENTS

| JP | 01-144702 | 6/1989 |
| JP | 6-113220 A | 4/1994 |
| JP | 8-172388 A | 7/1996 |
| JP | 09321517 A | * 12/1997 |
| JP | 2003-318795 A | 11/2003 |

OTHER PUBLICATIONS

Japanese Office Action dated Nov. 17, 2009 including English translation (Four (4) pages).

* cited by examiner

*Primary Examiner*—Brian T Pendleton
*Assistant Examiner*—Pinkal Chokshi
(74) *Attorney, Agent, or Firm*—Crowell & Moring LLP

(57) ABSTRACT

A television receiver is connected to a multi-directional antenna having multiple receiving directions for receiving a television signal by making one receiving direction active, and comprises a clock, a tuner, a memory for storing a receiving direction table having content containing channel numbers and a best receiving direction, and a microprocessor for controlling the receiver.

Based on the time measured by the clock, the microprocessor renews the content of the table at a preset time, and outputs, to the antenna, a control signal to command a receiving direction for receiving one channel based on the renewed content of the table.

The receiver can properly adapt to the variations in time of the receiving conditions of terrestrial broadcasts based on the renewed content of the table, and can automatically renew the content of the table in a time zone when a user does not view a television program.

3 Claims, 13 Drawing Sheets

FIG. 6

RECEIVING DIRECTION TABLE — 50

| CHANNEL NO. | REGISTER FLAG | BEST DIRECTION |
|---|---|---|
| 1 | OFF | 2 |
| 2 | ON | 3 |
| 3 | ON | 9 |
| 4 | ON | 1 5 |
| 5 | OFF | 7 |
| ⋮ | ⋮ | ⋮ |
| 1 2 9 | ON | 6 |

51   53   52

TELEVISION BROADCAST RECEIVER

BACKGROUND OF THE INVENTION

1. Field of the Invention

The present invention relates to a television broadcast receiver for receiving television broadcast signals transmitted from multiple directions.

2. Description of the Related Art

In the North American Continent where ATSC (Advanced Television Systems Committee) digital television is broadcast, big cities spread across the plains. Accordingly, digital television broadcast signals, which are broadcast in big cities or their suburbs, can be received in other cities or intermediate areas between the cities. In addition, NTSC (National Television System Committee) analog television continues to be broadcast. From the viewpoint of each television user or viewer, television broadcast signals come from various directions. Thus, it is necessary for the television user to adjust the direction of an antenna in the direction of a broadcast tower transmitting a television broadcast signal of a television program which the user wishes to watch.

For this reason, multi-directional antennas such as a so-called smart antenna are put to practical use. The EIA (Electronic Industries Association)-909 standard provides a smart antenna having sixteen equiangular receiving directions in 360 degrees. Multi-directional antennas which are actually commercialized have various types such as one that changes the receiving direction by rotating the antenna using a motor, and one that has multiple antennas and selects an active antenna direction by turning on and off electronic switches (the antenna themselves do not rotate).

Some of television broadcast receivers each connected to such multi-directional antenna are each set to be able to adjust the receiving direction of the multi-directional antenna, and have an omni-directional scan function to automatically select the receiving direction of the multi-directional antenna in which a television broadcast signal of a channel selected by a television user can be best received (such receiving direction being hereafter referred to simply as "best receiving direction"). Receiving conditions of each of the above television broadcast receivers to receive television broadcast signals (terrestrial broadcasts) are considered to vary with time zone due to causes or influences of, for example, traffic amount, usage state of amateur radio, broadcast of another channel in an adjacent frequency band, and so on. However, conventional television broadcast receivers cannot properly adapt to the variations in time of the receiving conditions of the terrestrial broadcasts due to the above causes.

SUMMARY OF THE INVENTION

An object of the present invention is to provide a television broadcast receiver that can properly adapt to variations in time of receiving conditions of terrestrial broadcasts.

According to a first aspect of the present invention, we provide a television broadcast receiver connected to a multi-directional antenna having predetermined multiple receiving directions for receiving a television broadcast signal, transmitted in one of multiple channels from one of multiple broadcast stations, by making one of the multiple receiving directions active, the television broadcast receiver comprising: a clock for measuring time; a tuner connected to the multi-directional antenna for receiving a television broadcast signal; a memory for storing a receiving direction table having content containing information of channel numbers of the channels transmitted from the broadcast stations and information of a best receiving direction or directions of the multi-directional antenna for receiving one or more of the channels; and a microprocessor for controlling the entire television broadcast receiver including the tuner and the memory.

Based on the time measured by the clock, the microprocessor renews, at a time preset by a user (i.e. set time), the content of the receiving direction table stored in the memory, and the microprocessor further outputs, to the multi-directional antenna, a control signal to command a receiving direction for receiving one of the channels on the basis of the renewed content of the receiving direction table.

According to the television broadcast receiver of the first aspect of the present invention, a user can set the set time, taking into considerations variations in time of the receiving conditions of terrestrial broadcasts so as to make it possible for the microprocessor to renew the content of the receiving direction table stored in the memory such that the renewed content adapts to the variations in time of the receiving conditions of the terrestrial broadcasts. Thus, the television broadcast receiver can properly adapt to the variations in time of the receiving conditions of the terrestrial broadcasts on the basis of the renewed content of the receiving direction table, and can automatically renew the content of the receiving direction table, using e.g. a time zone when a user does not view a television program.

Preferably, based on the time measured by the clock, the microprocessor sequentially outputs, to the multi-directional antenna, a control signal to command all the receiving directions of the multi-directional antenna at a time preset by a user for the tuner to sequentially receive the television broadcast signal in all the receiving directions, and the microprocessor further determines the best receiving direction for an arbitrary one of the channels transmitted from the broadcast stations on the basis of signal intensities of the television broadcast signal in all the receiving directions, and still further renews the information of the best receiving direction in the receiving direction table on the basis of the determination of the best receiving direction.

Further preferably, the memory stores a receiving direction table for each of predetermined time zones preset by the user, and the microprocessor renews, based on the time measured by the clock, the content of the receiving direction table for each of the predetermined time zones preset by the user.

Thereby, based on the renewed content of the receiving direction table, the receiver can properly control the receiving direction of the multi-directional antenna according to each time zone. Accordingly, the television broadcast receiver can properly adapt to the variations in time of the receiving conditions of terrestrial broadcasts.

It is possible to design the television broadcast receiver such that the microprocessor renews the content of the receiving direction table when a state, where the signal intensity of the television broadcast signal received by the tuner is lower than a predetermined value, continues for a predetermined delay time. Thereby, it is possible to prevent the renewal of the content of the receiving direction table from being excessively performed in a no-signal state. Note here that in the present specification, the term "no-signal state" is used to mean that the signal intensity of a television broadcast signal received by the tuner is lower than a predetermined value.

It is also possible to design the television broadcast receiver that the microprocessor determines the delay time for each of the predetermined time zones.

According to a second aspect of the present invention, we provide a television broadcast receiver connected to a multi-directional antenna having predetermined multiple receiving directions for receiving a television broadcast signal, transmitted in one of multiple channels from one of multiple broadcast stations, by making one of the multiple receiving directions active, the television broadcast receiver comprising: a time measuring means for measuring time; a control signal output means for outputting, to the multi-directional antenna, a control signal to command a receiving direction of the television broadcast signal; a receiving means connected to the multi-directional antenna for receiving a television broadcast signal; a receiving direction table storage means for storing a receiving direction table having content containing information of channel numbers of the channels transmitted from the broadcast stations and information of a best receiving direction or directions of the multi-directional antenna for receiving one or more of the channels; an omni-directional scan means for determining the best receiving direction for an arbitrary one of the channels transmitted from the broadcast stations by sequentially commanding all the receiving directions of the multi-directional antenna with the control signal output means, and by receiving the television broadcast signal in all the receiving directions with the receiving means, and for renewing the content of the receiving direction table on the basis of the determination of the best receiving direction; and a timer scan means for causing the omni-directional scan means to determine the best receiving direction at a time preset by a user on the basis of the time measured by the time measuring means so as to renew the content of the receiving direction table.

According to a third aspect of the present invention, we provide a television broadcast receiver connected to a multi-directional antenna having predetermined multiple receiving directions for receiving a television broadcast signal, transmitted in one of multiple channels from one of multiple broadcast stations, by making one of the multiple receiving directions active, the television broadcast receiver comprising: a time measuring means for measuring time; a control signal output means for outputting, to the multi-directional antenna, a control signal to command a receiving direction of the television broadcast signal; a receiving means connected to the multi-directional antenna for receiving a television broadcast signal; a receiving direction table storage means for storing a receiving direction table having content containing information of channel numbers of the channels transmitted from the broadcast stations and information of a best receiving direction or directions of the multi-directional antenna for receiving one or more of the channels; and a time zone-divided receiving direction table creating means for creating a receiving direction table for each of predetermined time zones preset by a user on the basis of the time measured by the time measuring means, and for storing the receiving direction table in the receiving direction table storage means.

According to a fourth aspect of the present invention, we provide a television broadcast receiver connected to a multi-directional antenna having predetermined multiple receiving directions for receiving a television broadcast signal, transmitted in one of multiple channels from one of multiple broadcast stations, by making one of the multiple receiving directions active, the television broadcast receiver comprising: a time measuring means for measuring time; a control signal output means for outputting, to the multi-directional antenna, a control signal to command a receiving direction of the television broadcast signal; a receiving means connected to the multi-directional antenna for receiving a television broadcast signal; a receiving direction table storage means for storing a receiving direction table having content containing information of channel numbers of the channels transmitted from the broadcast stations and information of a best receiving direction or directions of the multi-directional antenna for receiving one or more of the channels; an omni-directional scan means for determining the best receiving direction for an arbitrary one of the channels transmitted from the broadcast stations by sequentially commanding all the receiving directions of the multi-directional antenna with the control signal output means, and by receiving the television broadcast signal in all the receiving directions with the receiving means, and for renewing the content of the receiving direction table on the basis of the determination of the best receiving direction; a no-signal scanning means for causing the omni-directional scan means to determine the best receiving direction when a state, where the signal intensity of the television broadcast signal received by the receiving means is lower than a predetermined value, continues for a predetermined delay time so as to renew the content of the receiving direction table; and a delay time determining means for determining, on the basis of the time measured by the time measuring means, the delay time used by the no-signal scanning means for each of predetermined time zones.

According to a fifth aspect of the present invention, we provide a television broadcast receiver connected to a multi-directional antenna having predetermined multiple receiving directions for receiving a television broadcast signal, transmitted in one of multiple channels from one of multiple broadcast stations, by making one of the multiple receiving directions active, the television broadcast receiver comprising: a time measuring means for measuring time; a control signal output means for outputting, to the multi-directional antenna, a control signal to command a receiving direction of the television broadcast signal; a receiving means connected to the multi-directional antenna for receiving a television broadcast signal; a receiving direction table storage means for storing a receiving direction table having content containing information of channel numbers of the channels transmitted from the broadcast stations, information of a best receiving direction or directions of the multi-directional antenna for receiving one or more of the channels, and register channel information indicating whether or not the respective channels are registered as selectable channels; an omni-directional scan means for determining, based on signal intensities of the received television broadcast signal, the best receiving direction and the register channel information for an arbitrary one of the channels transmitted from the broadcast stations by sequentially commanding all the receiving directions of the multi-directional antenna with the control signal output means, and by receiving the television broadcast signal in all the receiving directions with the receiving means, and for renewing the content of the receiving direction table on the basis of the determination of the best receiving direction; an all-channel scan means for causing the omni-directional scan means to repeat the determination of the best receiving direction so as to determine the best receiving direction and the register channel information for each of all the channels transmitted from the broadcast stations, and renew the content of the receiving direction table on the basis of the determination of the best receiving directions; a timer scan means for causing the omni-directional scan means or the all-channel scan means to determine the best receiving direction or directions at a time preset by a user on the basis of the time measured by the time measuring means so as to renew the content of the receiving direction table; a time zone-divided receiving direction table creating means for creating a receiving direction table for each of predetermined time zones preset by the user on the basis of the time measured by the time measuring means, and for storing the receiving direction table in the receiving direction table storage means; a no-signal scanning means for causing the omni-directional scan means to determine the best receiving direction when a state, where the signal intensity of the television broadcast signal received by the receiving means is lower than a predetermined value, continues for a predetermined delay time so as to renew the content of the receiving direction table; and a delay time determining means for determining, on the basis of the time measured by the time measuring means, the delay time to be used by the no-signal scanning means for each of predetermined time zones.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 6 is a schematic view showing an example of a receiving direction table created by the all-channel scan process in the TV broadcast receiver;

DESCRIPTION OF THE PREFERRED EMBODIMENTS

The best modes and preferred embodiments of the present invention will be described hereinafter with reference to the annexed drawings. Note that the specific embodiments described are not intended to cover the entire scope of the present invention, and hence the present invention is not limited to only the specific embodiments.

Figure 1:
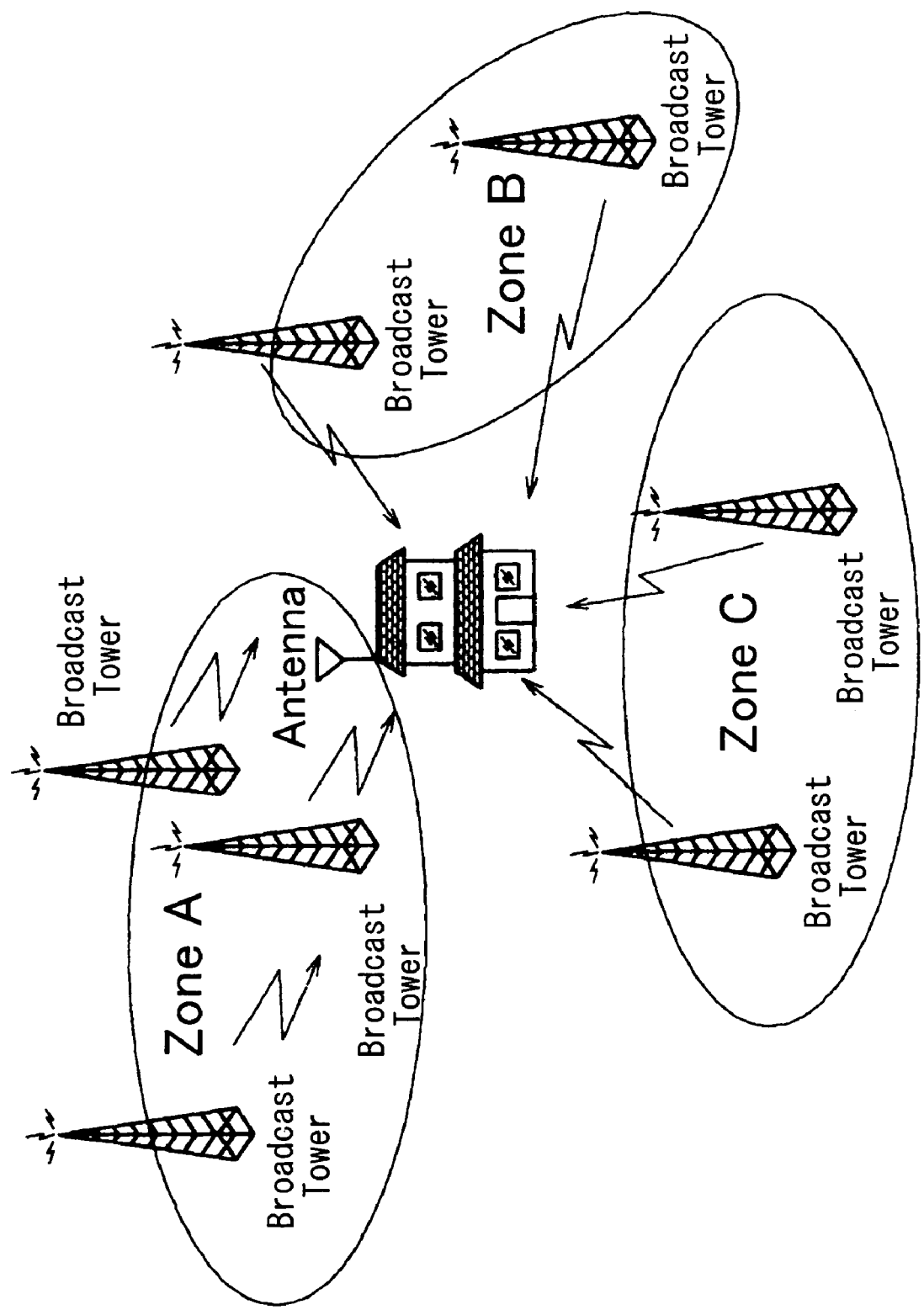
FIG. 1 is a schematic view showing a situation in which a TV broadcast receiver in a general home receives TV (television) broadcast signals of broadcast stations from broadcast towers located in various zones.

FIG. 1 is a schematic view showing a situation in which a TV broadcast receiver in a general home receives digital television (TV) broadcast signals of broadcast stations (hereafter referred to simply as "TV broadcast signals") from broadcast towers located in various zones. Generally, if the TV broadcast receiver receives digital TV broadcast signals of digital (terrestrial) TV broadcast which have a signal intensity equal to or higher than a predetermined threshold value, it is possible to obtain images of a certain quality or higher, using error correction and the like. Here, it is assumed that as shown in FIG. 1, the TV broadcast receiver in the home of the user can receive TV broadcast signals transmitted from broadcast towers spreading across multiple locations e.g. in zone A, zone B and zone C, thereby making it possible for the user to view TV programs from the broadcast stations. A multi-directional antenna, called a smart antenna, having multiple receiving directions is put to practical use for such situation.

Figure 2:
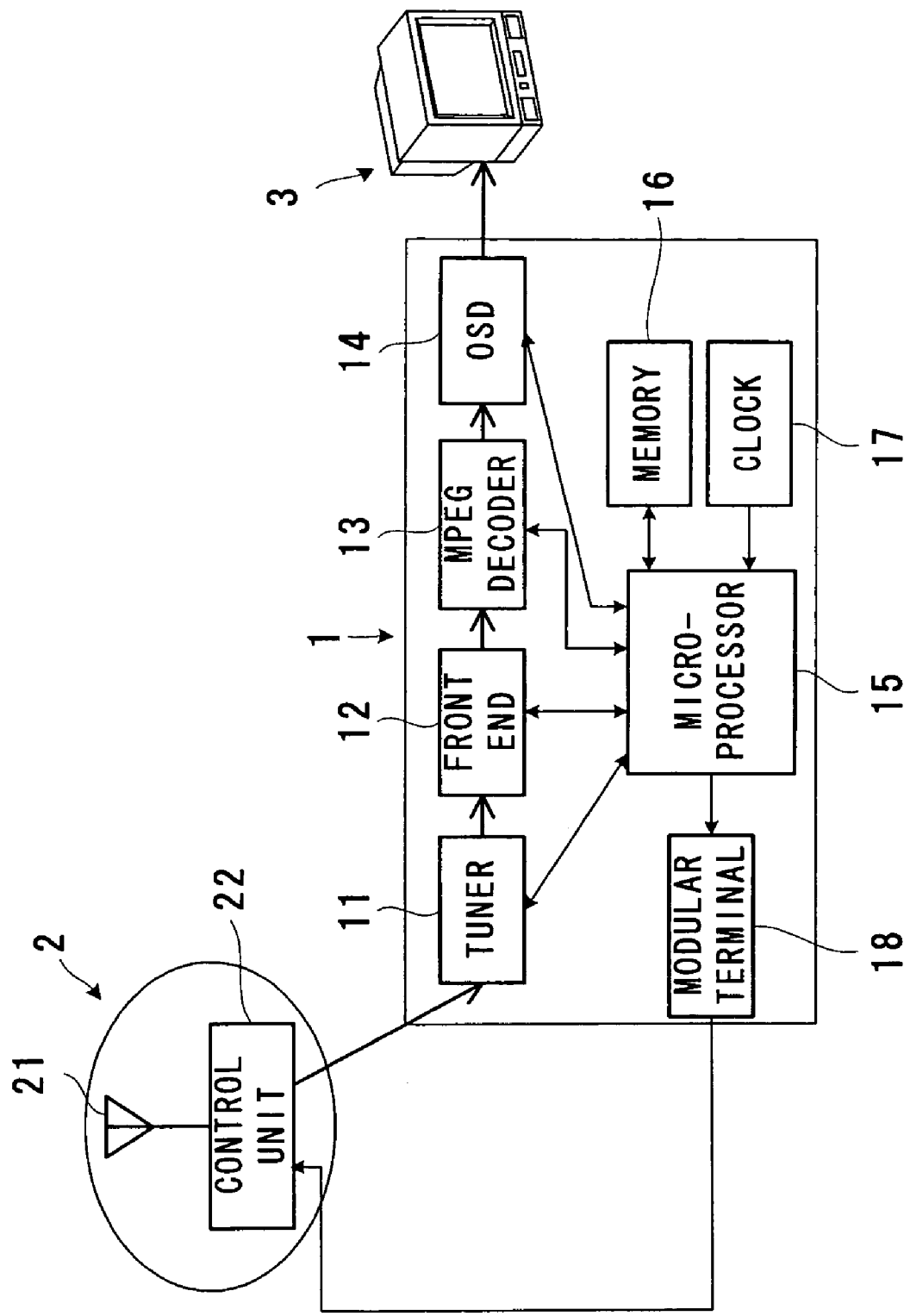
FIG. 2 is a schematic block diagram showing a TV broadcast receiver according to a first embodiment and a second embodiment of the present invention.

FIG. 2 is a schematic block diagram showing a TV broadcast receiver 1 according to a first embodiment, and a later described second embodiment, of the present embodiment. First, the first embodiment will be described in the following. The TV broadcast receiver 1 is connected to a smart antenna 2 having multiple receiving directions, and switches an active receiving direction of the smart antenna (namely, makes one of the multiple receiving directions of the smart antenna active) so as to receive a TV broadcast signal transmitted in a given frequency band from one of the broadcast towers spreading across the multiple locations, and to output a TV program contained in the TV broadcast signal in each channel to a monitor 3. Note that in the present embodiment, a physical channel that is a frequency band of carrier wave used for a TV program is referred to simply as "channel".

Referring to FIG. 2, the TV broadcast receiver 1 comprises: a tuner (receiving means) 11 connected to the smart antenna 2 for receiving a TV broadcast signal; a front end 12 for subjecting the TV broadcast signal received by the tuner 11 to predetermined signal processing, and decoding the received TV broadcast signal; an MPEG (Motion Picture Experts Group) decoder 13 for decoding the TV broadcast signal which is an MPEG-compressed signal; an on-screen display (OSD) 14 for superimposing a signal of a predetermined display image on the decoded TV broadcast signal; a microprocessor (control signal output means) 15 for detecting receiving conditions of TV broadcast signals received by the tuner 11 so as to control a control unit 22 of the smart antenna 2, and for controlling the entire TV broadcast receiver 1; a memory (receiving direction table storage means) 16 for storing a receiving direction table (table of receiving directions); a clock (time measuring means) 17 for measuring time; a modular terminal 18; and so on.

The TV broadcast signal decoded by the MPEG decoder 13 is output to the monitor 3 via the on-screen display 14 for display. The microprocessor 15 serves as an omni-directional scan means, an all-channel scan means and a timer scan means for performing an omni-directional scan process, an all-channel scan process and a timer scan process, respectively, as will be described later.

The receiving direction table stored in the memory 16 contains: channel numbers of respective channels transmitted from the broadcast stations via the broadcast towers; best receiving directions of the smart antenna 2 for receiving the respective channels; and register channel information indicating whether the respective channels are registered as selectable channels, or registered as non-selectable channels. Based on the register channel information, the microprocessor 15 performs channel selection from only the channels which are registered therein as the selectable channels. In the channel selection, the microprocessor 15 reads, from the memory 16, the best receiving direction of a selected channel. The microprocessor 15 further outputs, to the smart antenna 2, a control signal to command the best receiving direction. In the descriptions below, the state where a channel is registered as a selectable channel is referred to as "on-state of register flag" or "register flag on", while the state where a channel is registered as a non-selectable channel is referred to as "off-state of register flag" or "register flag off".

Figure 3:
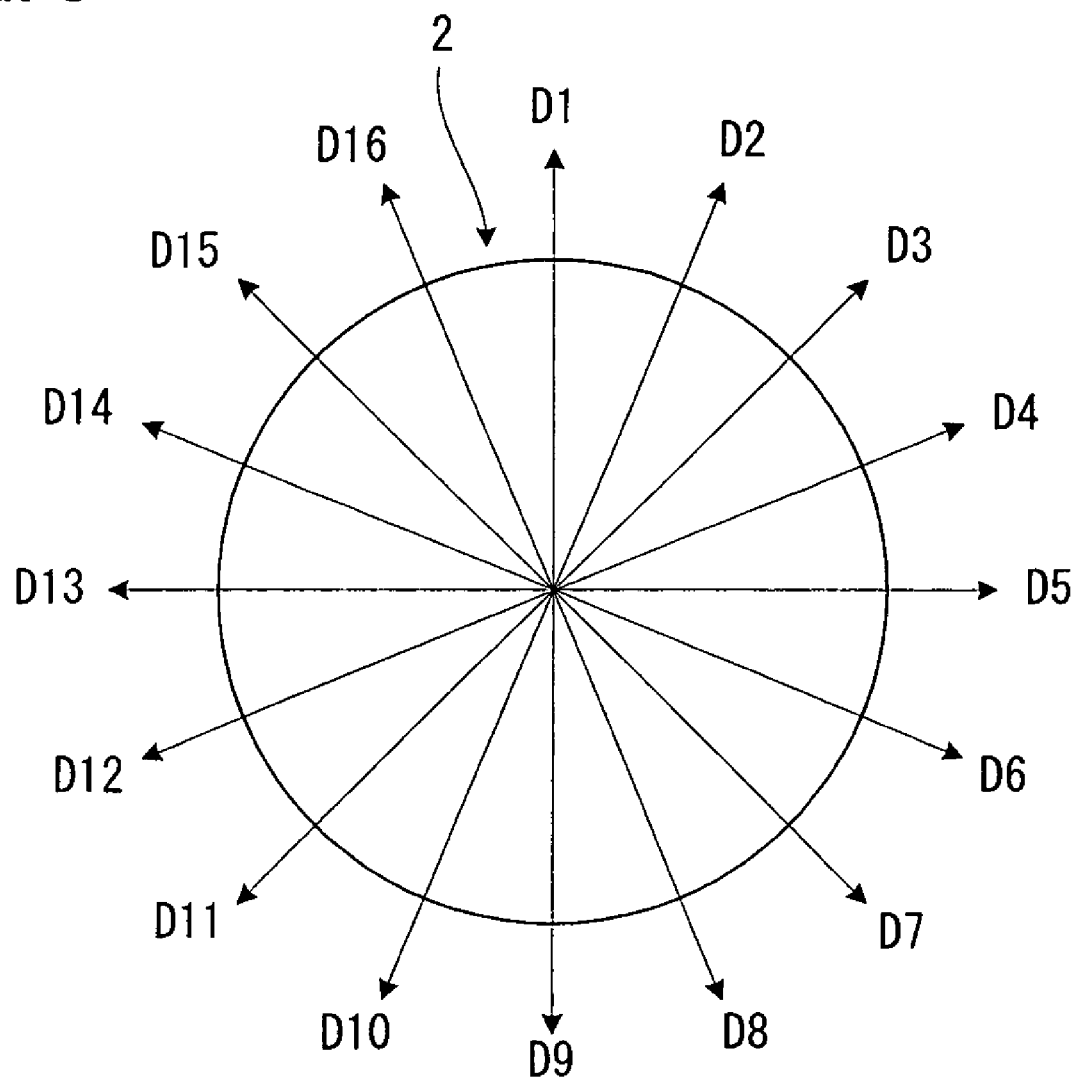
FIG. 3 is a chart showing and explaining multiple receiving directions of a smart antenna connected to the TV broadcast receiver.

FIG. 3 is a chart showing and explaining multiple receiving directions of the smart antenna 2. When connected to the smart antenna 2, the TV broadcast receiver 1 according to the present embodiment receives, and measures receiving conditions of, TV broadcast signals coming from sixteen receiving directions provided in the EIA-909 standard as indicated by D1 to D16 in FIG. 3, respectively. The smart antenna 2 comprises: an antenna unit 21 for receiving TV broadcast signals from the sixteen receiving directions D1 to D16 by mechanically or electronically switching an active receiving direction (namely, making one of the multiple receiving directions active); and a control unit 22 for controlling the operation of the antenna unit 21. Based on the control signal from the TV broadcast receiver 1, the control unit 22 makes active one of the multiple receiving directions D1 to D16 of the antenna unit 21 which is commanded by the control signal.

Figure 4:
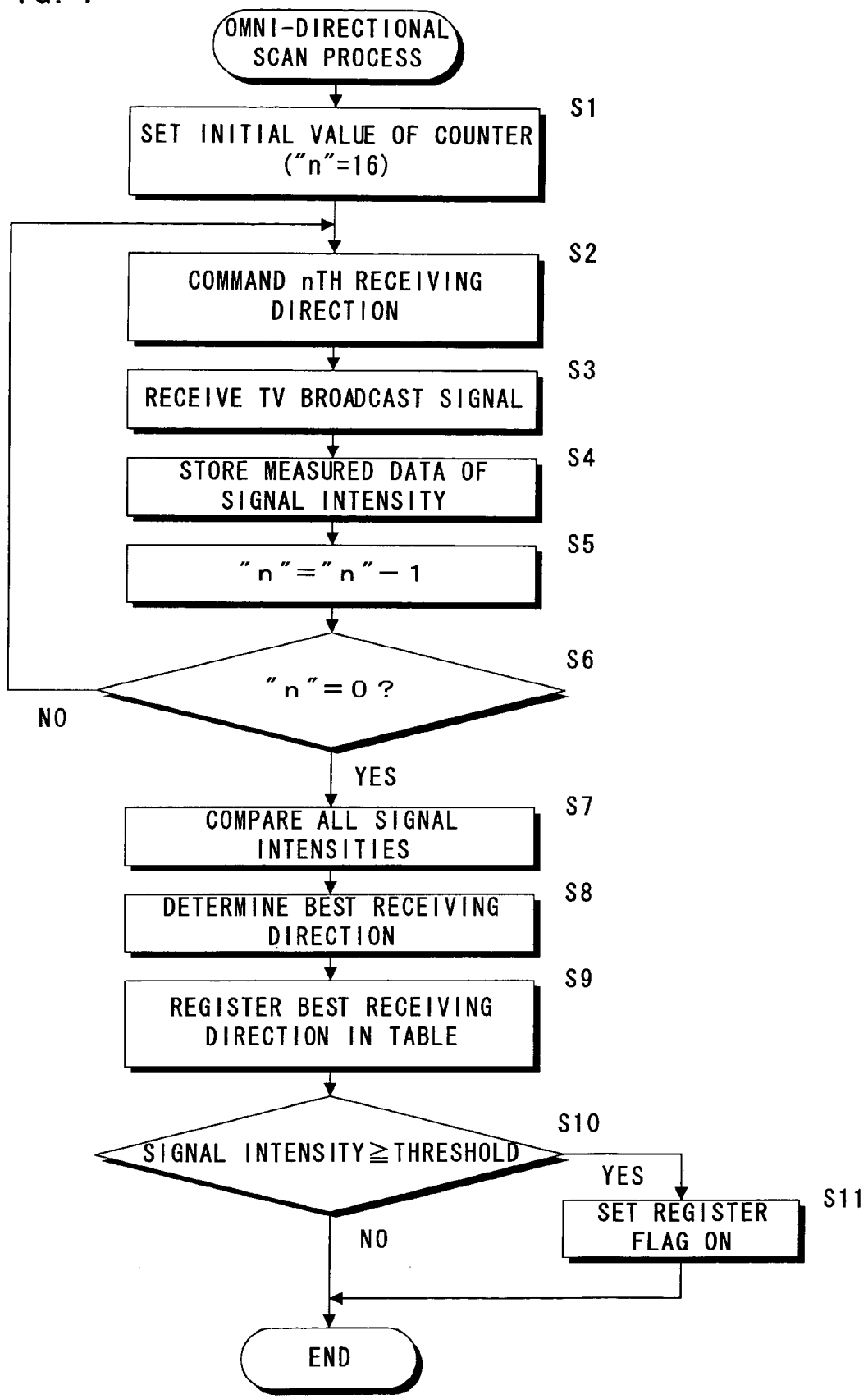
FIG. 4 is a flow chart showing an omni-directional scan process performed by the TV broadcast receiver according to the first embodiment of the present invention.

Hereinafter, referring to the flow chart of FIG. 4, an omni-directional scan process performed by the TV broadcast receiver 1 for determining e.g. a best receiving direction for an arbitrary one of broadcast stations (arbitrary one of broadcast towers) will be described.

When a user selects an omni-directional scan mode, and sets a channel for which a best receiving direction is to be determined, the microprocessor 15 sets an initial value n (n=16 here) of a counter according to the number of the receiving directions D1 to D16 of the smart antenna 2 (S1). The microprocessor 15 outputs, to the smart antenna 2, a control signal to command an nth receiving direction (S2), so that the tuner 11 receives a TV broadcast signal of the set channel (S3). The microprocessor 15 further measures the signal intensity of the received TV broadcast signal, and stores the measured data of signal intensity in the memory 16 (S4).

Thereafter, the microprocessor 15 decrements the counter by one (S5), and determines whether or not the TV broadcast receiver 1 has measured signal intensities of the received TV broadcast signal for all the receiving directions of the smart antenna 2 (S6). If the microprocessor 15 has not measured signal intensities of the TV broadcast signal for all the receiving directions (NO in S6), the microprocessor 15 goes back to the step S2, and measures the signal intensity or intensities of the TV broadcast signal not having been measured. In other words, for determining the best receiving direction of a channel, the microprocessor 15 sequentially outputs the control signal to the smart antenna 2 for sequentially scanning all the receiving directions of the smart antenna 2.

If the microprocessor 15 completes the measurements of the signal intensities of the TV broadcast signal for all the receiving directions (YES in S6), so that the microprocessor 15 stores all the measured data of signal intensities in the memory 16, the microprocessor 15 reads the measured data stored in the memory 16. The microprocessor 15 then compares all the signal intensities (S7), and thereby determines the receiving direction to give the maximum signal intensity as a best receiving direction of the TV broadcast signal (S8), and further registers the best receiving direction for the channel in the receiving direction table (S9).

The microprocessor 15 furthermore determines whether or not the signal intensity of the best receiving direction is equal to or higher than a predetermined threshold value (S10). If it is equal to or higher than the predetermined threshold value (YES in S10), the microprocessor 15 sets the register flag on for the channel in the receiving direction table (S11), thereby ending the process. On the other hand, if the signal intensity of the best receiving direction is lower than the predetermined threshold value (NO in S10), the microprocessor 15 does not set the register flag on for the channel in the receiving direction table (namely maintains the off-state of register flag), thereby ending the process.

Figure 5:
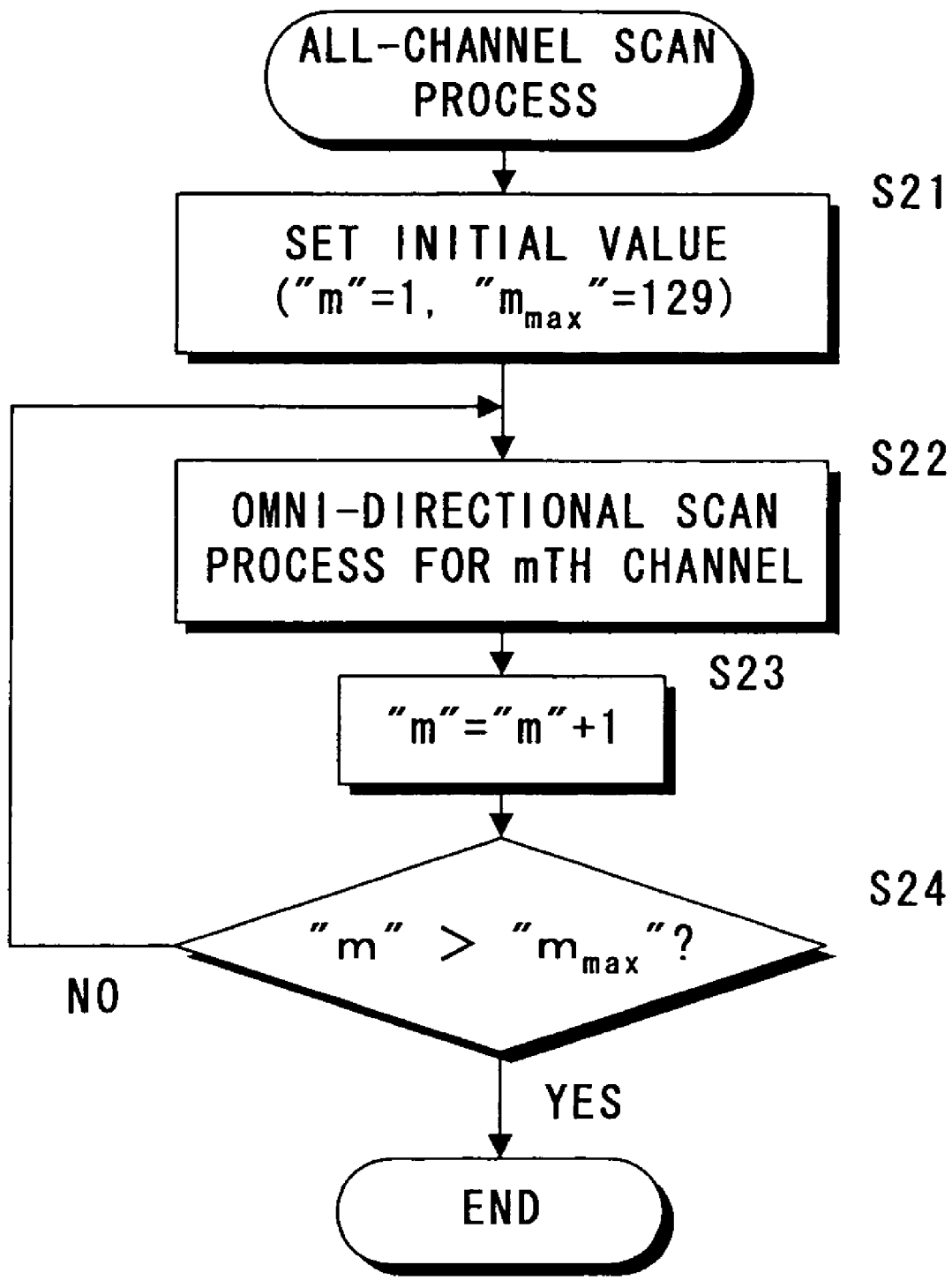
FIG. 5 is a flow chart showing an all-channel scan process performed by the TV broadcast receiver.

Next, referring to the flow chart of FIG. 5, an all-channel scan process performed by the microprocessor 15 for determining e.g. a best receiving direction for each of all channels (all receivable channels) transmitted from all broadcast stations (all broadcast towers) will be described.

When a user selects an all-channel scan mode, the microprocessor 15 sets, according to the number of channels transmitted from the broadcast stations, an initial value m of a counter as well as a number $m_{max}$ of channels for each of which a best receiving direction is to be determined (S21). By performing the omni-directional scan process described above for an mth channel, the microprocessor 15 determines a best receiving direction and register channel information for the mth channel, and registers the best receiving direction and the register channel information in the receiving direction table (S22).

Thereafter, the microprocessor 15 increments the counter by one (S23), and determines whether or not the microprocessor 15 itself has completed the omni-directional scan process for all the channels (S24). If the microprocessor 15 has not completed the omni-directional scan process for all the channels (NO in S24), the microprocessor 15 goes back to the step 22, and performs the omni-directional scan process for the channels not having been subjected to the omni-directional scan process (more specifically performs the omni-directional scan process for each subsequent channel until completion). If the microprocessor 15 completes the omni-directional scan process for all the channels (YES in S24), the microprocessor 15 ends the process.

FIG. 6 is a view showing an example of a receiving direction table 50 created by the above all-channel scan process. The receiving direction table 50 stores best receiving directions (best directions) 52 and register channel information 53 that correspond to channel numbers 51. In FIG. 6, each on-state of register flag is indicated by "ON", while each off-state of register flag is indicated by "OFF". Further, respective numbers shown in the column of the best receiving directions 52 correspond to the receiving directions D1 to D16 of the smart antenna 2 shown in FIG. 3 (for example, "2" corresponding to the receiving direction "D2", and "3 corresponding to the receiving direction D3").

Figure 7:
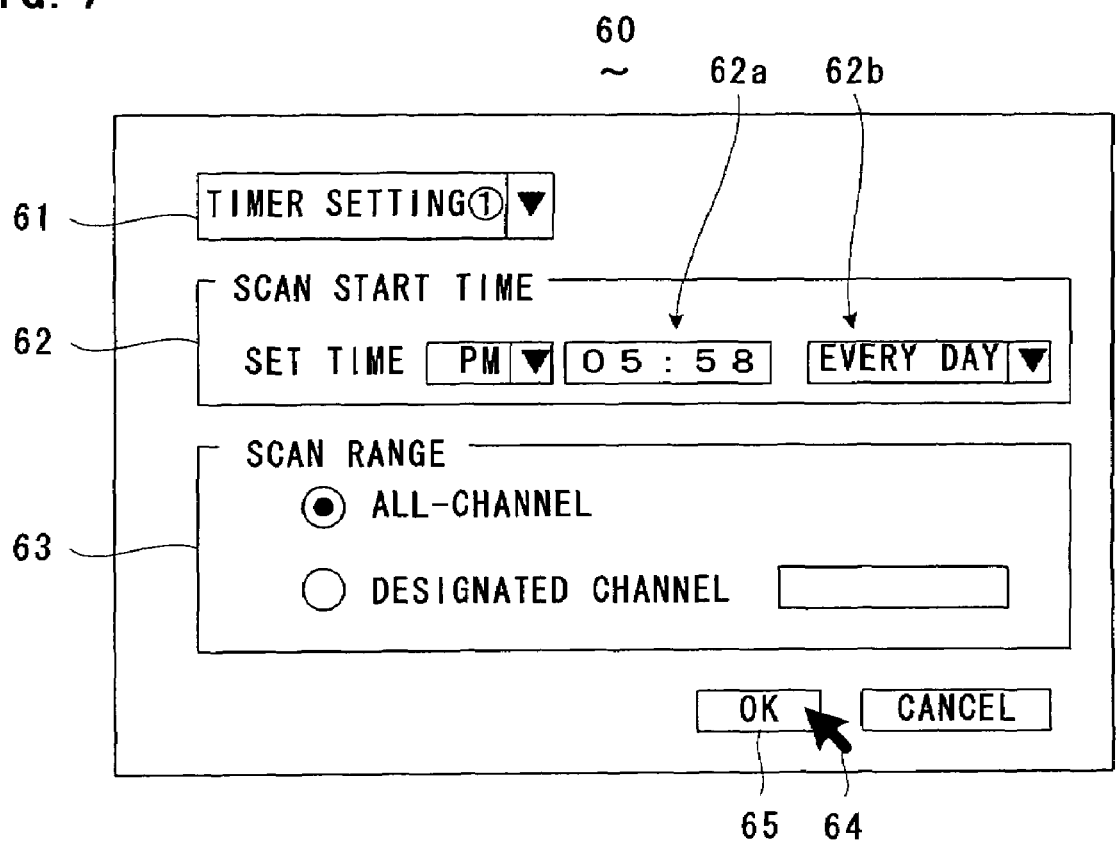
FIG. 7 is a schematic view showing a setting screen for a timer scan performed by the TV broadcast receiver.

Next, referring to FIG. 7 and FIG. 8, a timer scan process will be described. FIG. 7 is a view showing a setting screen 60 for the timer scan. The setting screen 60 has setting areas, as input areas, comprising a process mode setting area 61, a scan start time setting area 62 and a scan range setting area 63 for setting respective setting items of a process mode, a scan start time and a scan range. The process mode setting area 61 is used to distinguish among timer settings in making multiple setting modes. The scan start time setting area 62 includes a set time input area 62a and a set repetition rate input area 62b which is used to set a repetition rate of the timer scan process, whether everyday or only once or the like. A user can use the scan range setting area 63 to select a setting of either an all-channel scan process or an omni-directional scan process for a channel or channels which the user designates. Using a cursor 64, the user sets the respective setting items, and clicks an OK button 65 to end the setting of the timer scan.

Figure 8:
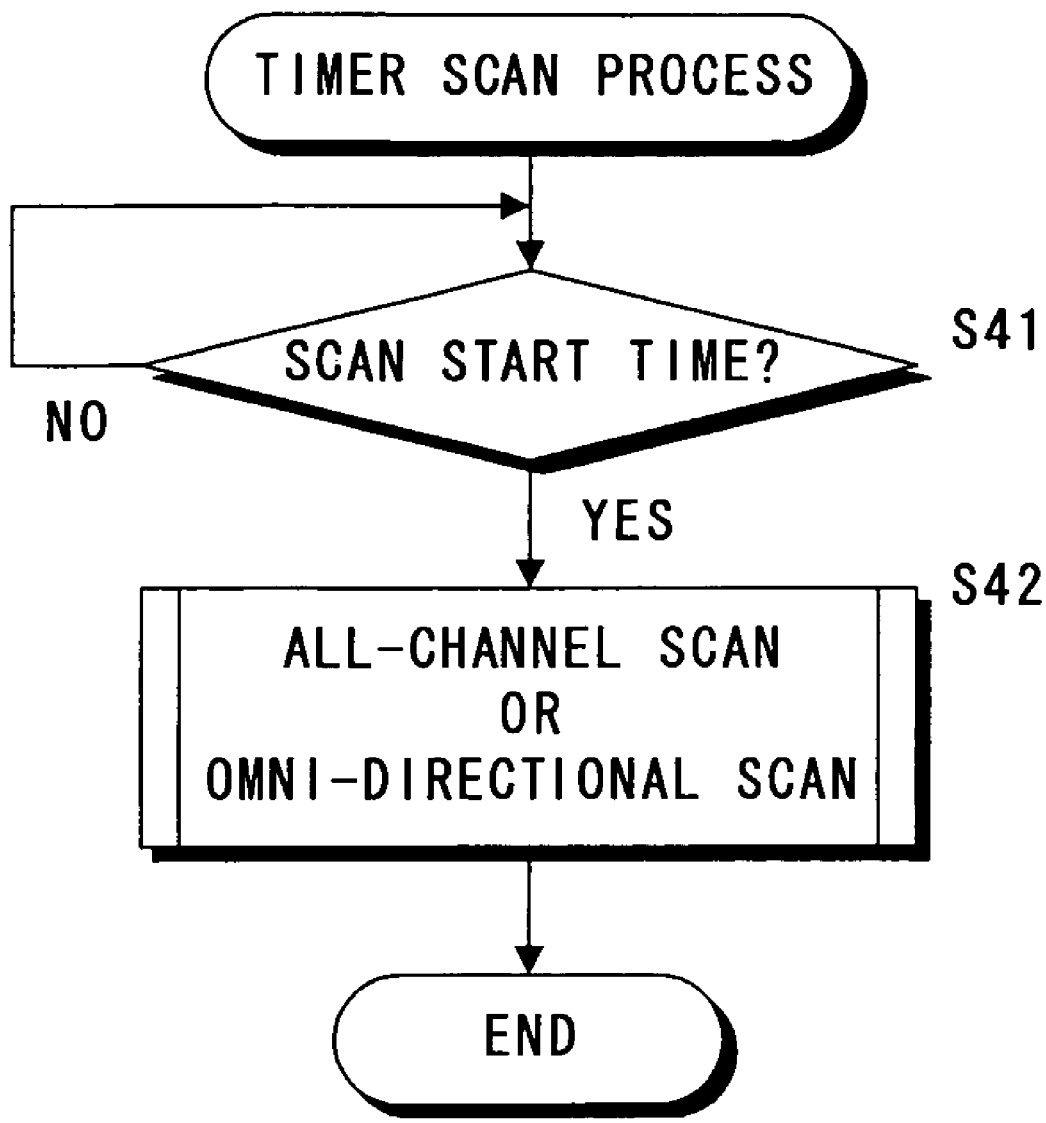
FIG. 8 is a flow chart showing a timer scan process performed by the TV broadcast receiver.

When the setting of the timer scan by the user ends, the microprocessor 15 monitors whether the scan start time is reached (S41), based on a signal from the clock 17 as shown in a flow chart of FIG. 8. When the scan start time is reached (YES in S41), the microprocessor 15 performs either an all-channel scan process, or an omni-directional scan process for a channel designated by the user (S42). In the example of the timer scan setting shown in FIG. 7, the microprocessor 15 performs the all-channel scan process at 05:38 pm, thereby renewing the content of the receiving direction table 50.

According to the TV broadcast receiver 1 of the present embodiment, the content of the receiving direction table 50 is renewed by performing an all-channel scan process or the like at a scan start time preset by a user on the basis of time measured by the clock 17. Accordingly, the content (best receiving direction and register channel information) of the receiving direction table 50 can be automatically renewed, using e.g. a time zone in which the user does not view a TV program.

Hereinafter, referring to FIG. 9 to FIG. 13, a second embodiment of the present invention will be described. A TV broadcast receiver 1 of the present embodiment is similar to the TV broadcast receiver 1 of the first embodiment, except that the TV broadcast receiver 1 of the present embodiment comprises a time zone-divided receiving direction table creating means for creating a time zone-divided receiving direction table, a no-signal scanning means for scanning during no signal and a delay time determining means. The microprocessor 15 serves as the time zone-divided receiving direction table creating means, and as the no-signal scanning means, and also as the delay time determining means by performing a time zone-divided receiving direction table creating process and a no-signal scanning process for scanning during no signal that will be described later. Note that the term "time zone-divided receiving direction table" is used in the present embodiment to mean a receiving direction table created for each preset and predetermined time zone. Further note that the term "no signal" is used in the present embodiment to mean a signal having a signal intensity lower than a predetermined value.

Figure 9:
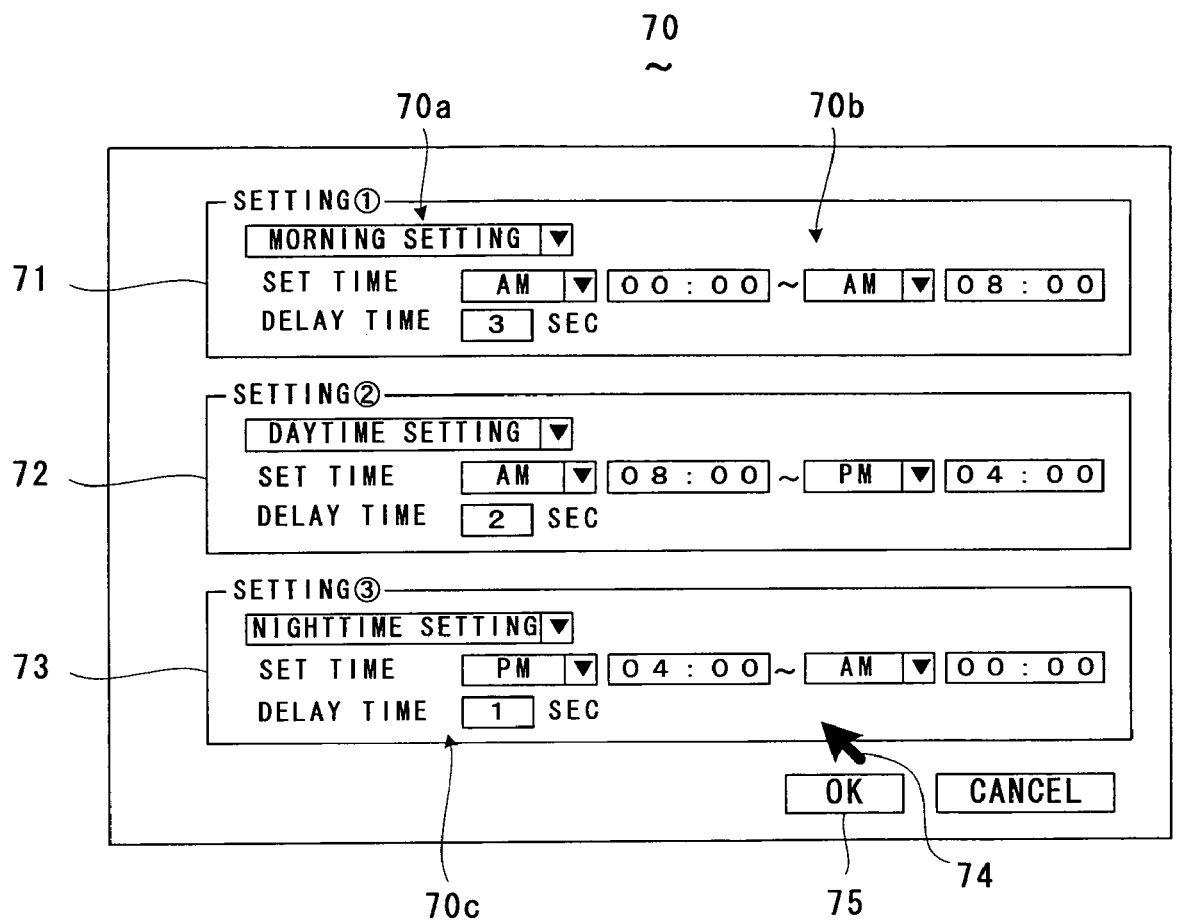
FIG. 9 is a schematic view showing a setting screen for a time zone-divided receiving direction table in a TV broadcast receiver according to the second embodiment of the present invention.

FIG. 9 is a view showing a setting screen 70 for setting various conditions to create a time zone-divided receiving direction table. The setting screen 70 has setting areas 71 to 73, as input areas, for setting respective multiple setting items so as to make it possible to set a receiving direction table for each one of multiple time zones. Each of the setting areas 71 to 73 has a time zone input area 70a, a set time input area 70b and a delay time input area 70c. Note that the term "delay time" is used to mean time from a time point when a signal intensity of a TV broadcast signal becomes lower than a predetermined value to a time point when an omni-directional scan process is started. Using a cursor 74, a user inputs various conditions of each setting item in each of the setting areas 71 to 73, and clicks an OK button 75 to end the settings of various conditions for the time zone-divided receiving direction table. In the example of the present embodiment, the setting of receiving direction table with "morning setting" being input in the time zone input area 70a is made for a set time from 00:00 am to 08:00 am, and the setting of receiving direction table with "daytime setting" being input in the time zone input area 70a is made for a set time from 08:00 am to 04:00 pm, while the setting of receiving direction table with "nighttime setting" being input in the time zone input area 70a is made for a set time from 04:00 pm to 00:00 am.

Figure 10:
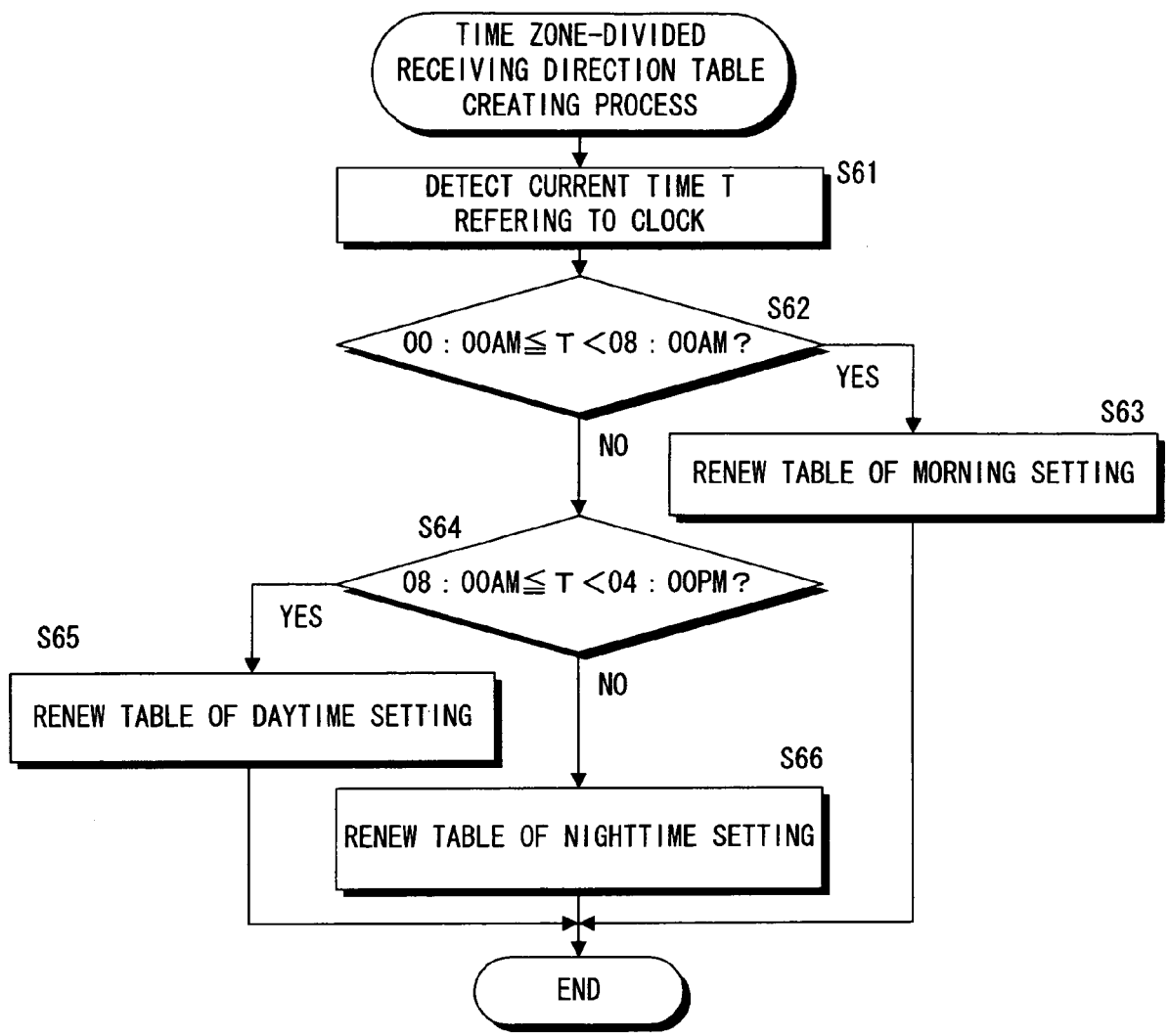
FIG. 10 is a flow chart showing a time zone-divided receiving direction table creating process performed by the TV broadcast receiver.

Next, referring to FIG. 10, a time zone-divided receiving direction table creating process to create a time zone-divided receiving direction table will be described. When a user selects an omni-directional scan mode, the microprocessor 15 references output from the clock 17 so as to detect current time T (S61), and determines whether or not the current time T is within the range of the time zone of morning setting (S62). If it is within the time zone of morning setting (YES in S62), the microprocessor 15 performs the omni-directional scan process so as to renew the content (best receiving direction and register channel information) of the receiving direction table of the morning setting (S63). On the other hand, if the current time T is not within the range of the time zone of morning setting (NO in S62), the microprocessor 15 subsequently determines whether it is within the range of the time zone of daytime setting (S64). If it is within the time zone of daytime setting (YES in S64), the microprocessor 15 performs the omni-directional scan process so as to renew the content (best receiving direction and register channel information) of the receiving direction table of the daytime setting (S65). On the other hand, if it is not within the range of the time zone of daytime setting (NO in S64), the microprocessor 15 performs the omni-directional scan process so as to renew the content (best receiving direction and register channel information) of the receiving direction table of the nighttime setting (S66).

In the present embodiment, it has been described above to use the omni-directional scan process for renewing the content of the receiving direction table of each time zone. Instead of the omni-directional scan process, it is also possible to use the all-channel scan process or the timer scan process for renewing the content of the receiving direction table in a similar manner. Furthermore, if the time zone-divided receiving direction table creating process described above is performed for the first time for the receiving direction table of the one time zone where no best receiving direction or register channel information is registered in the receiving direction table of either one of the time zones, it is possible to register the same content (best receiving direction and register channel information) as that of the renewed receiving direction table of the one time zone in the other receiving direction tables of the other time zones.

Figure 11:
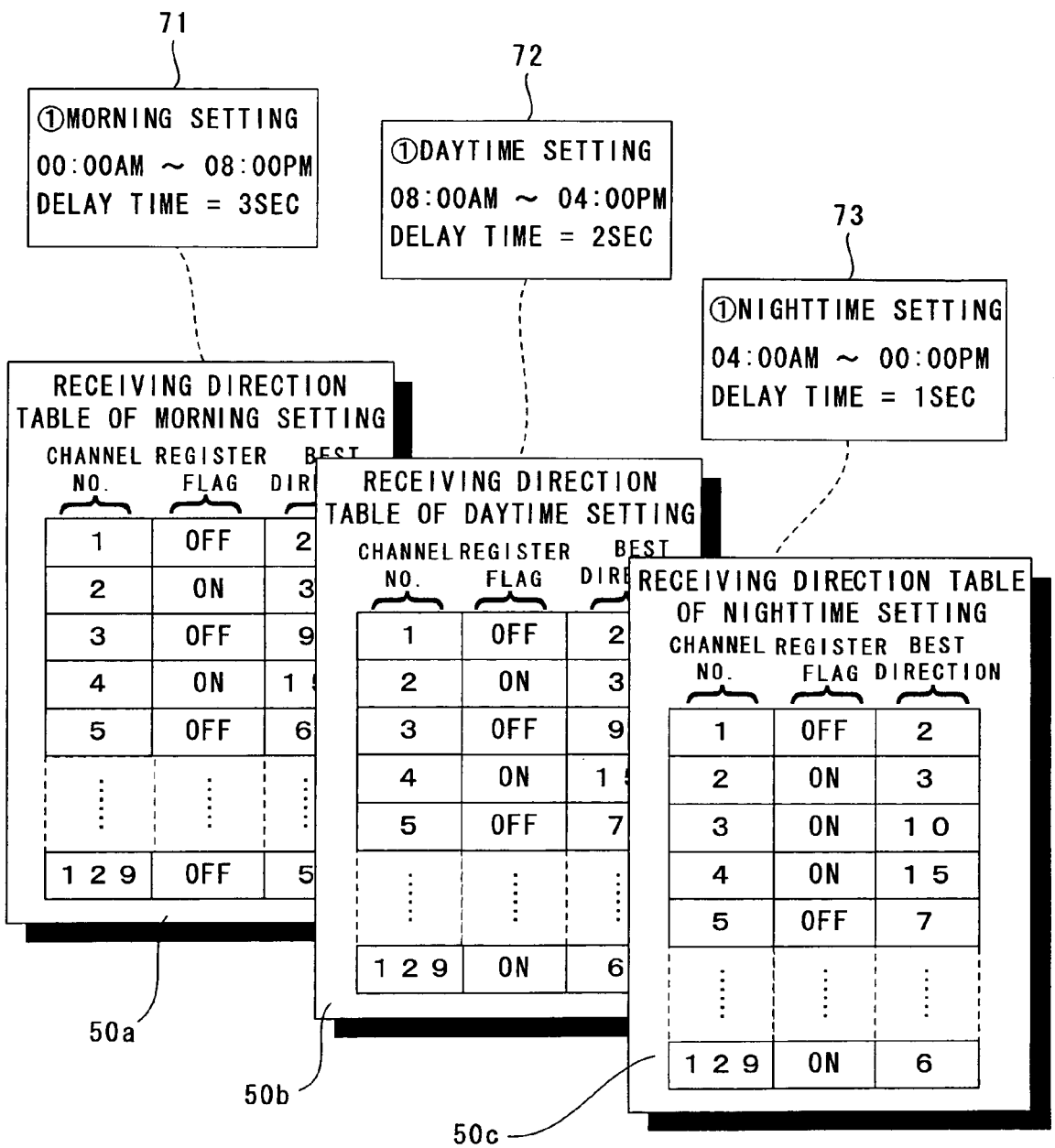
FIG. 11 is a schematic view showing an example of a combination of receiving direction tables created by the time zone-divided receiving direction table creating process.

FIG. 11 is a view showing an example of a combination of receiving direction tables created by the above time zone-divided receiving direction table creating process, which are receiving direction tables 50a, 50b and 50c of the morning setting, daytime setting and nighttime setting, respectively. As shown in FIG. 11, the states of the register flag and the best receiving directions may vary among the receiving direction tables 50a, 50b and 50c for the morning setting, daytime setting and nighttime setting, because receiving conditions of the TV broadcast receiver 1 to receive television broadcast signals (terrestrial broadcasts) may vary with time zone due to causes or influences of, for example, traffic amount, usage state of amateur radio, broadcast of another channel in an adjacent frequency band, and so on.

As described above, the TV broadcast receiver 1 according to the present embodiment performs the time zone-divided receiving table creating process to create receiving direction tables 50a to 50c for the respective predetermined time zones. Thereby, based on the created receiving direction tables 50a to 50c of the respective time zones, the TV broadcast receiver 1 can properly control the receiving direction of the smart antenna 2 according to the respective time zones, and thus can properly adapt to variations in time of receiving conditions of terrestrial broadcasts.

Figure 12:
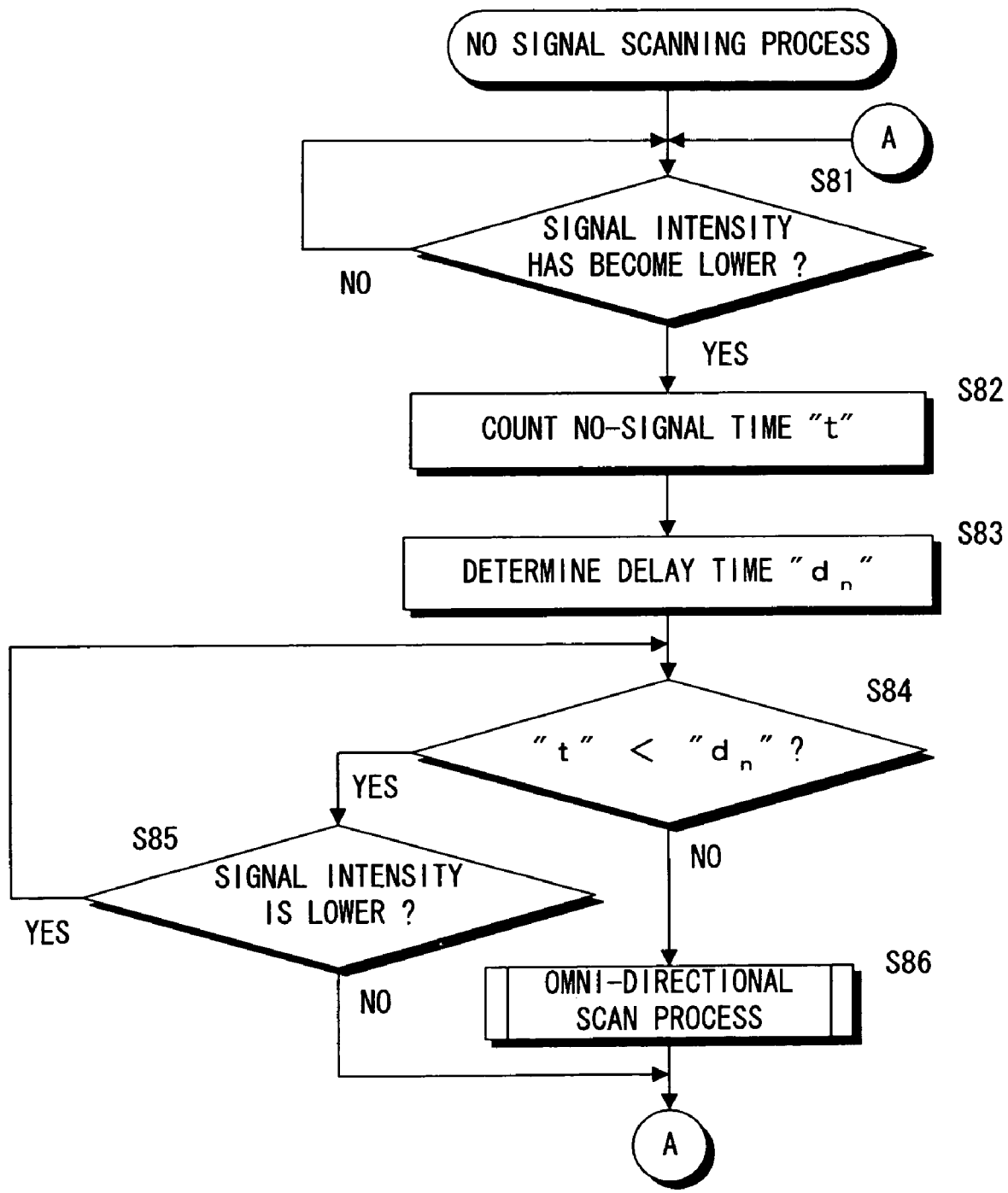
FIG. 12 is a flow chart showing a no-signal scanning process performed by the TV broadcast receiver.
Figure 13:
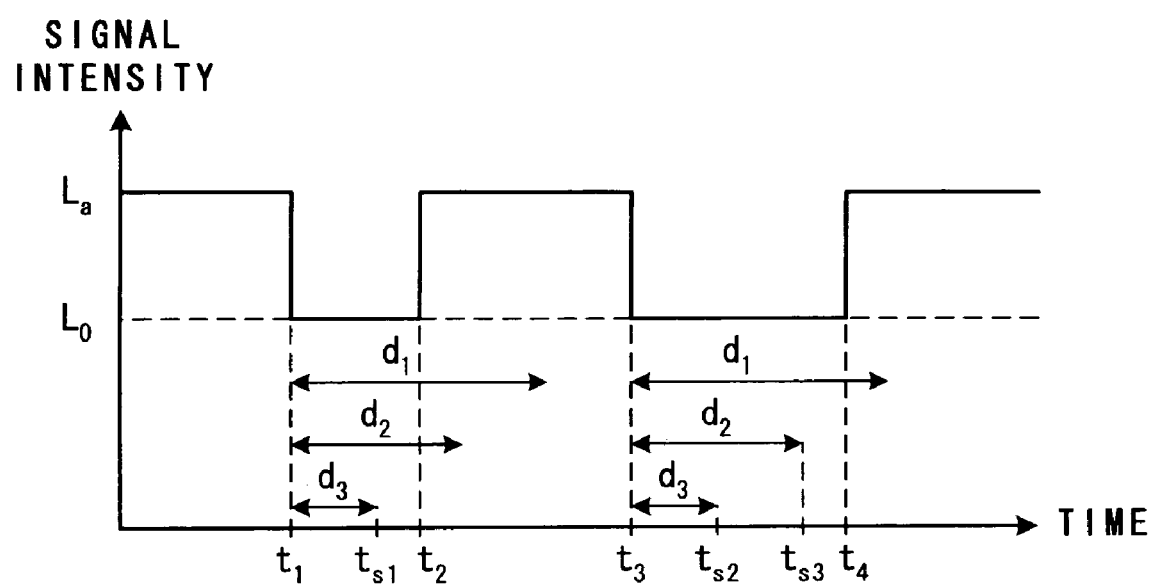
FIG. 13 is a graph for explaining the no-signal scanning process.

Next, a no-signal scanning process that is a scanning process performed during no signal will be described with reference to FIG. 12 showing a flow chart of the process and to FIG. 13 showing a graph for explaining the process. As shown in FIG. 12, the microprocessor 15 monitors the signal intensity of a TV broadcast signal while received, and determines whether or not the signal intensity has become lower than a predetermined value (S81). In the present specification, the state where the signal intensity is lower than the predetermined value is referred to as "no-signal" state. That is, the term "signal having a signal intensity lower than the predetermined value" is equivalent to "no signal" according to the present specification.

When the signal intensity has become lower than the predetermined value (YES in S81), namely in the no-signal state, the microprocessor 15 starts counting time (no-signal time) t from the time when the signal intensity has become lower than the predetermined value (S82), and references the clock 17 so as to determine one of the time zones of morning setting, daytime setting and nighttime setting to which the current time corresponds. Based on the determination result and the content of the settings set by a user using a setting screen 70 shown in FIG. 9, the microprocessor 15 determines a delay time $d_n$ (S83).

Thereafter, the microprocessor 15 compares the no-signal time t with the delay time $d_n$ so as to determine whether or not the no-signal time t exceeds the delay time $d_n$ (S84). If the no-signal time t does not exceed the delay time $d_n$ (YES in S84), the microprocessor 15 further determines whether or not the signal intensity is lower than the predetermined value (S85). If the signal intensity is equal to or higher than the predetermined value (NO in S85), the microprocessor 15 goes back to the step S81, and repeats the process from the step S81 onward. On the other hand, if the signal intensity is lower than the predetermined value (YES in S85), the microprocessor 15 goes back to the step S84, and repeats the process from the step S84 onward. Thereafter, when the no-signal time t exceeds the delay time $d_n$ (NO in S84), the microprocessor 15 performs an omni-directional scan process, and renews the content of the corresponding receiving direction table (S86).

Now, referring to FIG. 13, the no-signal scanning process will be described more specifically. FIG. 13 is an explanatory graph showing a relation between the signal intensity of the received TV broadcast signal in the vertical axis and time in the horizontal axis, where $L_a$ indicates the signal intensity in the normal state, while $L_o$ indicates the signal intensity in the no-signal state. Further, each of $t_1$ and $t_3$ indicates a time point when the receiving state changes from the normal state to the no-signal state, while each of $t_2$ and $t_4$ indicates a time point when the receiving state changes from the no-signal state to the normal state. In addition, $d_1$, $d_2$ and $d_3$ indicate delay times $d_n$ of the morning setting, daytime setting and nighttime setting, respectively.

The microprocessor 15 performs the no-signal scanning process so as to start counting no-signal time t from the time point $t_1$ (S81 and S82), and determines whether or not the no-signal time t exceeds the delay time $d_n$ (S83 and S84). In the case of the nighttime setting, the no-signal time t exceeds the delay time $d_3$ at a time point $t_{s1}$ (NO in S84). Accordingly, the microprocessor 15 performs an omni-directional scan process from the time point $t_{s1}$, and renews the receiving direction table of the nighttime setting (S86). On the other hand, in the case of the morning setting and daytime setting, the receiving state returns to the normal state at the time point $t_2$ before the no-signal time t exceeds the delay time $d_1$ and the delay time $d_2$ (NO in S85). Accordingly, the microprocessor 15 does not perform the omni-directional scan process, goes back to the step S81, and monitors the signal intensity of the received TV broadcast signal.

Thereafter, the microprocessor 15 starts counting no-signal time t from the time point $t_3$ when the receiving state changes to the no-signal state, and determines whether or not the no-signal time t exceeds the delay time $d_n$. In the case of the daytime setting and nighttime setting, the no-signal time t exceeds the delay time $d_2$ and the delay time $d_3$ at time points $t_{s3}$ and $t_{s2}$, respectively. Accordingly, the microprocessor 15 performs omni-directional scan processes from the time points $t_{s3}$ and $t_{s2}$, respectively, and renews the receiving direction tables of the daytime setting and nighttime setting. On the other hand, in the case of the morning setting, the receiving state returns to the normal state at the time point $t_4$ before the no-signal time t exceeds the delay times $d_1$. Accordingly, the microprocessor 15 does not perform the omni-directional scan process, goes back to the step S81, and monitors the signal intensity of the received TV broadcast signal.

It is known that during daytime than nighttime, noise is more likely to enter into radio waves, and short-range receiving conditions are more likely to deteriorate due to influences of e.g. noise. According to the no-signal scan process of the present embodiment, the delay time $d_2$ of the daytime is set to be longer than the delay time $d_3$ of the nighttime, and the omni-directional scan process is performed after waiting for a certain time for the recovery of the receiving state. Accordingly, the omni-directional scan process is not excessively performed in the daytime, preventing the viewing of a TV program by a user from being excessively interrupted. On the other hand, in the nighttime when short-range receiving conditions are less likely to deteriorate due to influences of e.g. noise, the delay time $d_3$ is set to be shorter, and the omni-directional scan process is performed at an early stage after the receiving state changes to the no-signal state, thereby making it possible to quickly determine e.g. a new best receiving direction.

As described in the foregoing, the TV broadcast receiver 1 of the present embodiment determines the delay time $d_n$ according to each time zone to receive the TV broadcast signal, and renews the content of the receiving direction table when the no-signal state continues for the delay time $d_n$. Accordingly, by properly setting delay time $d_n$ of each time zone, the TV broadcast receiver 1 can prevent the omni-directional scan process from being excessively performed in the no-signal state.

It is to be noted that the present invention is not limited to the above embodiments, and various modifications are possible. For example, the TV broadcast signals which the TV broadcast receiver 1 can receive are not limited to digital television broadcast signals, but can be analog television broadcast signals. Furthermore, the number of receiving directions of the smart antenna 2 is not limited to 16 as exemplified in the above embodiment, but can be another number such as 4 or 8.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2004-189975 filed Jun. 28, 2004, the contents of which are hereby incorporated by reference.

What is claimed is:

1. A television broadcast receiver connected to a multi-directional antenna having predetermined multiple receiving directions for receiving a television broadcast signal, transmitted in one of multiple channels from one of multiple broadcast stations, by making one of the multiple receiving directions active, the television broadcast receiver comprising:

a clock for measuring time;
a tuner connected to the multi-directional antenna for receiving a television broadcast signal;
a memory for storing a receiving direction table having content containing information of channel numbers of the channels transmitted from the broadcast stations and information of a best receiving direction or directions of the multi-directional antenna for receiving one or more of the channels; and
a microprocessor for controlling the entire television broadcast receiver including the tuner and the memory,
wherein based on the time measured by the clock, the microprocessor renews, at a time preset by a user, the content of the receiving direction table stored in the memory, and the microprocessor further outputs, to the multi-directional directional antenna, a control signal to command a receiving direction for receiving one of the channels on the basis of the renewed content of the receiving direction table,
wherein based on the time measured by the clock, the microprocessor sequentially outputs, to the multi-directional antenna, a control signal to command all the receiving directions of the multi-directional antenna at a time preset by a user for the tuner to sequentially receive the television broadcast signal in all the receiving directions, and the microprocessor further determines the best receiving direction for an arbitrary one of the channels transmitted from the broadcast stations on the basis of signal intensities of the television broadcast signal in all the receiving directions, and still further renews the information of the best receiving direction in the receiving direction table on the basis of the determination of the best receiving direction,
wherein the memory stores a receiving direction table for each of predetermined time zones preset by the user,
wherein based on the time measured by the clock, the microprocessor renews the content of the receiving direction table for each of the predetermined time zones preset by the user,
wherein the microprocessor renews the content of the receiving direction table when a state, where the signal intensity of the television broadcast signal received by the tuner is lower than a predetermined value, continues for a predetermined delay time,
wherein the microprocessor determines the delay time for each of the predetermined time zones, and
wherein the delay time of the time zone when short-range receiving conditions are more likely to deteriorate due to influence of noise is set to be longer than the delay time of the time zone when short-range receiving conditions are less likely to deteriorate due to influence of noise.

2. A television broadcast receiver connected to a multi-directional antenna having predetermined multiple receiving directions for receiving a television broadcast signal, transmitted in one of multiple channels from one of multiple broadcast stations, by making one of the multiple receiving directions active, the television broadcast receiver comprising:

a time measuring means for measuring time;
a control signal output means for outputting, to the multi-directional antenna, a control signal to command a receiving direction of the television broadcast signal;
a receiving means connected to the multi-directional antenna for receiving a television broadcast signal;
a receiving direction table storage means for storing a receiving direction table having content containing information of channel numbers of the channels transmitted from the broadcast stations and information of a best receiving direction or directions of the multi-directional antenna for receiving one or more of the channels;
an omni-directional scan means: for determining the best receiving direction for an arbitrary one of the channels transmitted from the broadcast stations by sequentially commanding all the receiving directions of the multi-directional antenna with the control signal output means, and by receiving the television broadcast signal in all the receiving directions with the receiving means; and for renewing the content of the receiving direction table on the basis of the determination of the best receiving direction;
a no-signal scanning means for causing the omni-directional scan means to determine the best receiving direction when a state, where the signal intensity of the television broadcast signal received by the receiving means is lower than a predetermined value, continues for a predetermined delay time so as to renew the content of the receiving direction table; and
a delay time determining means for determining, on the basis of the time measured by the time measuring means, the delay time used by the no-signal scanning means for each of predetermined time zones,
wherein the delay time of the time zone when short-range receiving conditions are more likely to deteriorate due to influence of noise is set to be longer than the delay time of the time zone when short-range receiving conditions are less likely to deteriorate due to influence of noise.

3. A television broadcast receiver connected to a multi-directional antenna having predetermined multiple receiving directions for receiving a television broadcast signal, transmitted in one of multiple channels from one of multiple broadcast stations, by making one of the multiple receiving directions active, the television broadcast receiver comprising:

a time measuring means for measuring time;
a control signal output means for outputting, to the multi-directional antenna, a control signal to command a receiving direction of the television broadcast signal;
a receiving means connected to the multi-directional antenna for receiving a television broadcast signal;
a receiving direction table storage means for storing a receiving direction table having content containing: information of channel numbers of the channels transmitted from the broadcast stations; information of a best receiving direction or directions of the multi-directional antenna for receiving one or more of the channels; and register channel information indicating whether or not the respective channels are registered as selectable channels;
an omni-directional scan means: for determining, based on signal intensities of the received television broadcast signal, the best receiving direction and the register channel information for an arbitrary one of the channels transmitted from the broadcast stations by sequentially commanding all the receiving directions of the multi-directional antenna with the control signal output means, and by receiving the television broadcast signal in all the receiving directions with the receiving means;

and for renewing the content of the receiving direction table on the basis of the determination of the best receiving direction;

an all-channel scan means for causing the omni-directional scan means to repeat the determination of the best receiving direction so as to determine the best receiving direction and the register channel information for each of all the channels transmitted from the broadcast stations, and renew the content of the receiving direction table on the basis of the determination of the best receiving directions;

a timer scan means for causing the omni-directional scan means or the all-channel scan means to determine the best receiving direction or directions at a time preset by a user on the basis of the time measured by the time measuring means so as to renew the content of the receiving direction table;

a time zone-divided receiving direction table creating means: for creating a receiving direction table for each of predetermined time zones preset by the user on the basis of the time measured by the time measuring means; and for storing the receiving direction table in the receiving direction table storage means;

a no-signal scanning means for causing the omni-directional scan means to determine the best receiving direction when a state, where the signal intensity of the television broadcast signal received by the receiving means is lower than a predetermined value, continues for a predetermined delay time so as to renew the content of the receiving direction table; and a delay time determining means for determining, on the basis of the time measured by the time measuring means, the delay time to be used by the no-signal scanning means for each of predetermined time zones, wherein by the delay time determining means, the delay time of the time zone when short-range receiving conditions are more likely to deteriorate due to influence of noise is determined to be longer than the delay time of the time zone when short-range receiving conditions are less likely to deteriorate due to influence of noise.

* * * * *